C. R. DAELLENBACH.
AIR BRAKE.
APPLICATION FILED OCT. 7, 1910.
1,010,597.
Patented Dec. 5, 1911.
2 SHEETS—SHEET 2.
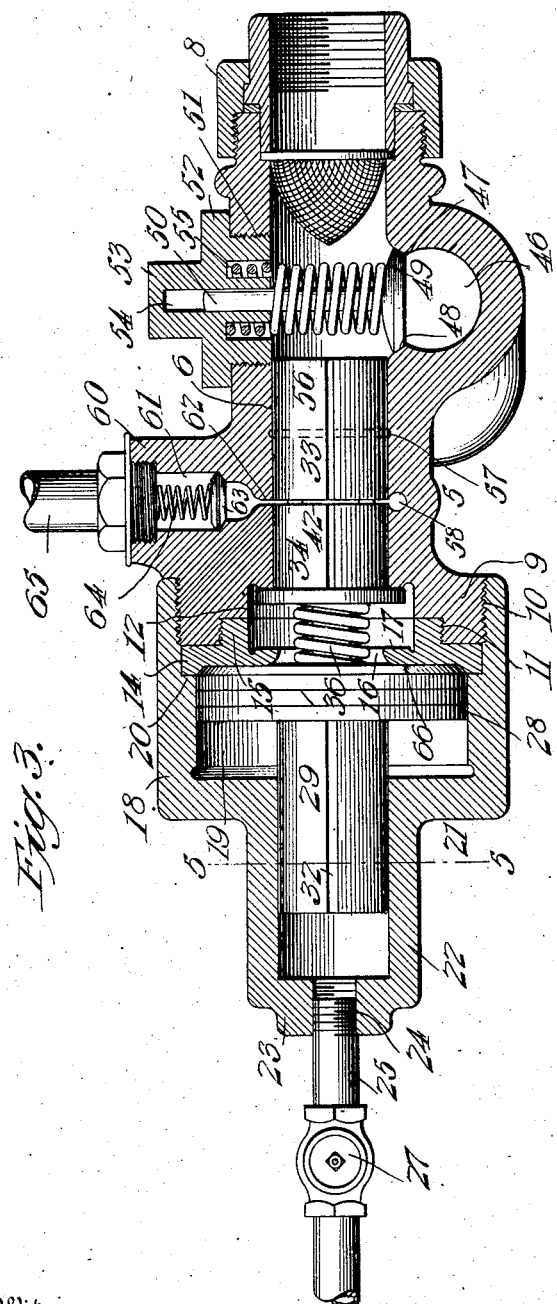

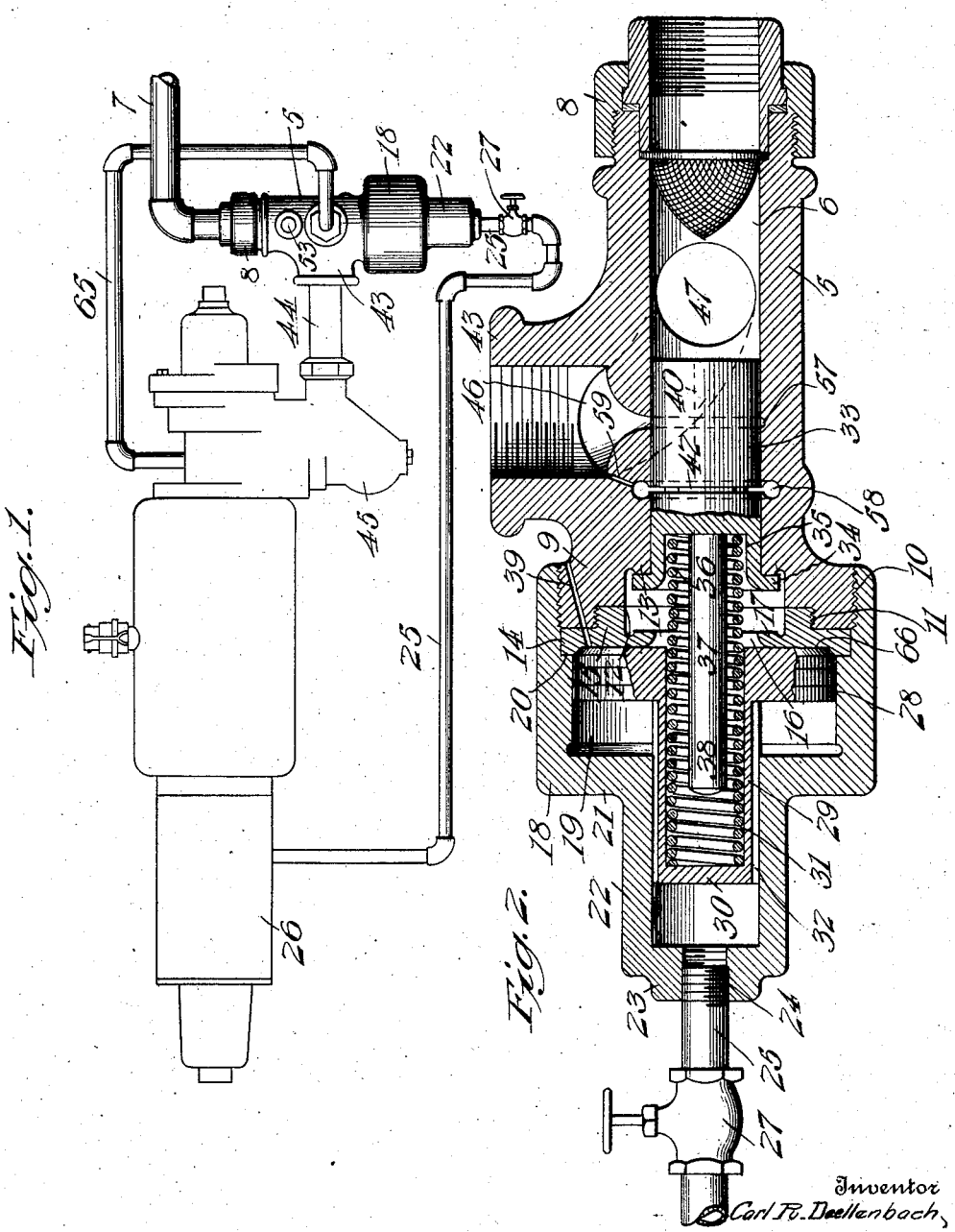

UNITED STATES PATENT OFFICE.

CARL R. DAELLENBACH, OF BRADDOCK, PENNSYLVANIA.

AIR-BRAKE.

1,010,597.          Specification of Letters Patent.          Patented Dec. 5, 1911.

Application filed October 7, 1910. Serial No. 585,791.

*To all whom it may concern:*

Be it known that I, CARL R. DAELLENBACH, a citizen of the United States, residing at Braddock, in the county of Allegheny and State of Pennsylvania, have invented a new and useful Air-Brake; and I do hereby declare the following to be a full, clear, and exact description of the invention, such as will enable others skilled in the art to which it appertains to make and use the same.

This invention relates to air brake systems, and has for its principal object to provide an automatic valve, by means of which the auxiliary reservoir will be recharged, after an application of the brakes, and which will permit of a second or more applications of said brakes, without releasing the same.

It is a well known fact that in air brake systems now in common use that when a train is going down hill, and a light application is made by the engineer, it is sometimes desired to make any number of other heavier applications in order to stop the train. It is found that several applications, either light or heavy, can be made, by exhausting the air in the auxiliary reservoir. Furthermore, it is necessary to release the brakes in order to charge the said auxiliary reservoir.

Another important object of my invention is to provide a mechanism of the character described which will permit an unlimited number of applications of any degree, whether they be light or heavy.

A still further object of the invention is to provide an automatic valve for the purpose described which is in the nature of an attachment to the air brake systems now in common use, and which can be quickly and easily positioned without disturbing any part of the present brake system.

Another important object of the invention is to provide an automatic valve attachment for the purpose described which is composed of a minimum number of parts and is therefore simple in construction, is positive in action and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view showing the brake cylinder, auxiliary cylinder, and triple valve, and my improved valve mechanism connected therewith. Fig. 2 is a horizontal sectional view through the valve. Fig. 3 is a vertical longitudinal sectional view taken through the reciprocating valve, Fig. 4 is a cross-sectional view of the piston valve; and Fig. 5 is a vertical sectional view taken on the line 5—5 of Fig. 3.

Like reference numerals designate corresponding parts in all the figures of the drawings.

Referring to the drawings, 5 designates the body, having a central longitudinal bore 6 formed therein. One end of the said body is connected to the train pipe 7 by a suitable coupling 8. The opposite end 9 of the body is enlarged and is preferably screw-threaded as shown by reference numeral 10. The said enlarged end 9 is counter-bored and screw-threaded, as shown by numeral 11. The said end is furthermore provided with a second counter-bore 12, forming a consequent shoulder 13. A disk 14 is provided with an offset flange 15, which has fitted engagement with the threaded bore 11 of the said enlarged end. The disk 14 is furthermore provided with a central opening 16, and a consequent seat 17.

A cap 18 has threaded engagement with the threaded portion 10 of the enlarged end of the body. This cap is provided with a chamber 19, which is formed with an annular shoulder 20. Beyond the shoulder 20, the chamber 19 is enlarged, and receives the threaded portion 10 of the body 5. Disposed between the shoulder 20 and the threaded end of the body 5 is the disk 14, the shoulder and the body 5 constituting means for holding the disk 14 securely in position. Integral with and extending from the closed end 21 of the cap 18 is a cylindrical extension 22, the end 23 thereof being closed with the exception of an opening 24 to which a pipe 25 is secured, said pipe 25 extending to and communicating with the brake cylinder 26 at a point in advance of the brake piston, not shown. This pipe is provided with a valve or shut-off 27 of any suitable construction and for a purpose hereinafter described. Located within the chamber 19 of the cap 18 is a piston 28, which is provided with a tubular extension 29, the outer end 30 thereof being closed. This piston is provided with a central opening 31 which is at all times in register with the interior of the said tubular extension. The said extension 30 is arranged to slide in the cylindrical extension 22 of the said cap and is provided on its periphery with a plurality of longitudinal slots or corrugations 32, which permit of communication between the pipe 25 and the space between the piston 28 and the end 21 of the cap.

The invention further comprises a piston valve 33, which moves in the bore 6 of the body 5 and is arranged contiguous to the enlarged end 9 thereof. Said piston valve is provided with a flange 34, the faces thereof coacting with the flange 17 and the shoulder 13 to form air tight connections or joints. The said piston valve is furthermore provided with a counter-bore 35, forming a seat for a coiled spring 36, which is arranged intermediate the said piston valve and the closed end 30 of the tubular extension 29 of the piston. Formed integral with the piston valve and projecting within the coiled spring 36 is a stem 37, the free end 38 thereof terminating at a suitable distance from the closed end 30 of the said tubular extension 29. A port 39 opens communication between the piston 28 and the atmosphere, and is adapted, upon movement of the piston in one direction, to permit any pressure to escape. The end of the piston valve, opposite the stem 37, is provided with a central longitudinal port 40, the inner end thereof communicating with a plurality of radially extending ports 41, which in turn communicate with a circumferential groove 42. The body 5 is furthermore provided with an interiorly threaded extension 43, to which is attached a pipe 44 connecting the triple valve 45. Communicating with the interior of the extension 43 and with the bore 6 of the body 5, is a port 46, the opening 47 thereof communicating with the bore 6 at a point between the end of the piston valve 33 and the coupling 8 of the train pipe. A valve seat 48 is formed around this opening and a valve 49 is seated thereupon, said valve being provided with an upwardly extending stem 50. Formed in the body, directly above the valve, is an opening 51, to which is detachably secured a threaded plug 52. This plug is provided with an extension 53, in which is formed a guide 54 for the stem 50. A counter-bore 55 is also formed in the plug 52 and is adapted to form a seat for a coiled spring 56, which surrounds the stem 50 and bears against the valve 49. A groove 57 is formed in the bore 6 of the body 5 and communicates with the interior of the extension 43 of the said body. A second groove 58 is formed in the bore 6 of the body 5 and at a point intermediate the said groove 57 and the shoulder 13, and communicating with this groove 58 is a small port 59 which in turn communicates with the interior of the extension 43 of the body.

The invention further comprises another extension 60, which is counter-bored as shown by numeral 61. Communicating with the said counter-bore and with the groove 58 is a port 62. A check valve 63 is suitably arranged within the counter-bore to close the said port 62 and is normally held in position by means of a coiled spring 64. The counter-bore 61 communicates with the slide-valve chamber of the triple valve by means of a pipe 65.

It will be observed that the disk 14 is recessed on its face adjacent the piston 28 and is beveled as shown by numeral 66 to form an air tight seat for the piston.

In operation, it is well known fact that the train line and the auxiliary reservoir are always fully charged when the train is in motion. A moderate reduction of air pressure in the train pipe 7 will cause the greater pressure remaining stored in the auxiliary reservoir to force the piston and its slide valve of the triple valve to a position which allows the air in the auxiliary reservoir to pass into the brake cylinder and apply the brake. After the piston in the brake cylinder moves out, the air pressure therein will pass through the pipe 25 and will permit air to pass therefrom into the tubular extension 22 of the cap 18 and from thence along the grooves 32 to a point in rear of the piston 28, said pressure causing the piston to move up against the tension of spring 36 until it contacts with seat 66. Simultaneously with the said movement of the piston, the spring 36 causes the piston valve to move forwardly in the bore 6 of the body 5 until the flange 34 thereof forms an air tight joint with the shoulder 13. In this latter position of the piston valve, the groove 57 is covered by the said piston and thereby shuts off communication between the slide chamber of the triple valve and the train line through the port 46. Simultaneously with the closing of this port, the circumferential groove 42 is placed in register with the groove 58, and consequently communication is established between the bore 6 and the interior of the extension 43 through the medium of ports 40 and 59 respectively. Furthermore, the port 62 is placed in communication with the slide valve chamber of the triple valve 45 through the medium of the pipe 65 and with the interior 6 of the body 5, through the medium of the port 40.

To recharge the auxiliary reservoir, the engineer sets his valve onto what is known as the "running position." As a result, air will pass directly from the train line, through the port 40, and the greater portion thereof will pass through the port 62, raising the check valve 63, against the action of the spring 64, through the pipe 65, into the slide valve chamber of the triple valve 45, and thence into the auxiliary reservoir. In recharging the auxiliary reservoir, the air pressure is necessarily greater than the strength of the spring 54, in order to open the valve 63. Simultaneously, therewith, air passes from the groove 58 and through the minute port 59, through the extension 43, through the pipe 44, into the check valve chamber of the triple valve, thus maintaining equal pressures upon opposite sides of the triple valve piston. In order to make another application, all that is necessary is for the engineer to reduce the air pressure a sufficient amount in the train line as in the first place. The air will then go from the check valve chamber of the triple valve, through the pipe 44, into the extension 43 of the body, through the port 46, and raising the valve 49 from its seat, escape into the train line. It will be observed that the pressure in the check valve chamber of the triple valve has been reduced, and as a result, greater pressure is found in the slide valve chamber of the said triple valve. As a result, the said higher pressure will cause the piston in the triple valve to move down and open communication between the brake cylinder and the auxiliary reservoir until the pressure in the auxiliary reservoir and the train line are nearly balanced. At this point, the triple valve shuts off communication between the auxiliary reservoir and the brake cylinder and the engineer can then pump up the auxiliary reservoir as before stated. An unlimited number of applications, as above stated, may be made in this manner.

In order to release the brakes, the engineer first establishes communication between the main reservoir and the train line until the pressure in the train line is slightly above the compressing power of the coiled spring 36. As a result, the air pressure thus established, causes the piston valve 33 to move forward and uncover port 57 and thereby make direct communication between the train line and the check valve chamber of the triple valve. Simultaneously therewith, the port 57 and also the port 62 is cut off from communication. The air pressure in the triple valve causes the piston and the slide valve therein to be moved to their normal positions and thereby restore communication between the train pipe and the auxiliary reservoir and recharge the auxiliary reservoir. In this position, the air in the brake cylinder is permitted to escape to the atmosphere through the triple valve exhaust port, connecting pipe and pressure retaining valve, thus releasing the brakes. The pressure in the brake cylinder being exhausted, permits the piston to move back and uncover the pipe 25, thereby permitting the air from the interior of the cap 18 to be exhausted into the atmosphere. The piston 28 will then be moved back by the spring 36. This operation may be repeated as often as desired and it will be seen from the foregoing that any number of applications, irrespective of degree can be made without releasing the brakes.

What I claim is:—

1. In combination with an air brake system including a train line, a triple valve, an auxiliary reservoir and brake cylinder, of a valve for automatically recharging the auxiliary reservoir without releasing the brakes and previous to another or heavier application thereof, said valve forming the connection between the train line and the triple valve, and a connection between the said valve and the brake cylinder.

2. In combination with an air brake system including a train line, a triple valve, an auxiliary reservoir and brake cylinder, of a valve for automatically recharging the auxiliary reservoir without releasing the brakes and previous to another or heavier application thereof, said valve forming the connection between the train line and the triple valve, a connection between the said valve and the brake cylinder, and a valve located in said valve connection.

3. In combination with an air brake system including a train line, a triple valve, an auxiliary reservoir and brake cylinder, of a valve for automatically recharging the auxiliary reservoir without releasing the brakes and previous to another or heavier application thereof, said valve forming the connection between the train line and the triple valve, a connection between the said valve and the brake cylinder, and a connection between the automatic valve and the slide valve chamber of the triple valve.

4. In combination with an air brake system including a train line, a triple valve, auxiliary reservoir and brake cylinder, of a valve connected therewith for automatically recharging the auxiliary reservoir without releasing the brakes and previous to another or heavier application thereof, said valve automatically opening communication between the slide valve chamber of the triple valve and the train line upon the release of air from the auxiliary reservoir into the brake cylinder.

5. In combination with an air brake system including a train line, a triple valve, an auxiliary reservoir and brake cylinder, of a valve for automatically recharging the auxiliary reservoir without releasing the brakes and previous to another or heavier application thereof, said valve forming the connection between the train line and the triple valve, and a connection between the said valve and the brake cylinder, said valve being provided with a piston valve adapted upon the release of air from the auxiliary reservoir into the brake cylinder to restrict communication from the train line to the check valve chamber of the triple valve.

6. In combination with an air brake system including a train line, a triple valve, an auxiliary reservoir and brake cylinder, of a valve for automatically recharging the auxiliary reservoir without releasing the brakes and previous to another or heavier application thereof, said valve forming the connection between the train line and the triple valve, and a connection between the said valve and the brake cylinder, said valve being provided with a piston valve adapted upon the release of air from the auxiliary reservoir into the brake cylinder to restrict communication from the train line to the check valve chamber of the triple valve, and simultaneously to permit of the passage of air from the train line through the valve and the slide valve chamber of the triple valve and into the auxiliary reservoir.

7. In combination with an air brake system including a train line, a triple valve, an auxiliary reservoir and brake cylinder, of a valve for automatically recharging the auxiliary reservoir without releasing the brakes and previous to another or heavier application thereof, said valve forming the connection between the train line and the triple valve, and a connection between the said valve and the brake cylinder, said valve being provided with a piston valve adapted upon the release of air from the auxiliary reservoir into the brake cylinder to restrict communication from the train line to the check valve chamber of the triple valve, and simultaneously to permit of the passage of air from the train line through the valve and the slide valve chamber of the triple valve and into the auxiliary reservoir, a portion of said air passing from the valve into the check valve chamber of the triple valve to balance the air pressure between the said slide and check valve chambers thereof.

8. In combination with an air brake system including a train line, a triple valve, an auxiliary reservoir and brake cylinder, of a valve forming a connection between the train line and the triple valve for automatically recharging the auxiliary reservoir without releasing the brakes and previous to another or heavier application thereof, a connection between the valve and the brake cylinder, and a piston valve arranged within the said valve and adapted upon an increase of pressure in the train line to permit of a direct communication between the train line and the check valve chamber of the triple valve and to simultaneously shut off communication between the train line and the slide valve chamber of the triple valve.

9. An attachment for air brake systems including a train line, a triple valve, auxiliary reservoir and brake cylinder, consisting of a valve connecting therewith for automatically recharging the auxiliary reservoir without releasing the brakes and previous to another or heavier application thereof, the said valve being adapted to form a connection between the train line and the triple valve, and a connection between the said valve and the brake cylinder.

10. An attachment for air brake systems including a train line, a triple valve, auxiliary reservoir and brake cylinder, consisting of a valve connecting therewith for automatically recharging the auxiliary reservoir without releasing the brakes and previous to another or heavier application thereof, the said valve being adapted to form a connection between the train line and the triple valve, a connection between the said valve and the brake cylinder, and a connection adapted to be formed between the automatic valve and the triple valve.

11. An attachment for air brake systems including a train line, a triple valve, auxiliary reservoir and brake cylinder, consisting of a valve connecting therewith for automatically recharging the auxiliary reservoir without releasing the brakes and previous to another or heavier application thereof, said valve being adapted to automatically open communication from the train line to the slide valve chamber of the triple valve upon the release of air from the auxiliary into the brake cylinder.

12. An attachment for air brake systems including a train line, a triple valve, auxiliary reservoir and brake cylinder, consisting of a valve connecting therewith for automatically recharging the auxiliary reservoir without releasing the brakes and previous to another or heavier application thereof, the said valve being adapted to form a connection between the train line and the triple valve, and a connection between the said valve and the brake cylinder, said valve being provided with a piston valve adapted upon release of air from the auxiliary into the brake cylinder to restrict communication from the train line to the check valve chamber of the triple valve.

13. An attachment for air brake systems including a train line, a triple valve, auxiliary reservoir and brake cylinder, consisting of a valve connecting therewith for automatically recharging the auxiliary reservoir without releasing the brakes and previous to another or heavier application thereof, the said valve being adapted to form a connection between the train line and the triple valve, and a connection between the said valve and the brake cylinder, said valve being provided with a piston valve adapted upon release of air from the auxiliary into the brake cylinder to restrict communication from the train line to the check valve chamber of the triple valve, and simultaneously to permit of air to pass from the train line through the valve and the slide valve chamber of the triple valve and into the auxiliary reservoir.

14. An attachment for air brake systems including a train line, a triple valve, auxiliary reservoir and brake cylinder, consisting of a valve connecting therewith for automatically recharging the auxiliary reservoir without releasing the brakes and previous to another or heavier application thereof, the said valve being adapted to form a connection between the train line and the triple valve, and a connection between the said valve and the brake cylinder, said valve being provided with a piston valve adapted upon release of air from the auxiliary into the brake cylinder to restrict communication from the train line to the check valve chamber of the triple valve, and simultaneously to permit of air to pass from the train line through the valve and the slide valve chamber of the triple valve and into the auxiliary reservoir, and from the valve into the check valve chamber of the triple valve to balance the air pressure in said slide valve chamber.

15. In combination with an air brake system including a train line, a triple valve, auxiliary reservoir and brake cylinder, of a valve forming a connection between the train line and the triple valve, for automatically recharging the auxiliary reservoir without releasing the brakes and previous to another or heavier application thereof, and a connection between the said valve and brake cylinder including a body having a longitudinal bore, a passage communicating with the check valve chamber of the triple valve and train line through the bore of the body, and a piston valve adapted upon the release of air from the auxiliary reservoir into the brake cylinder to cover the said passage and thereby restrict communication from the train line to the check valve chamber of the triple valve.

16. In combination with an air brake system including a train line, a triple valve, an auxiliary reservoir and brake cylinder, of a valve connected therewith for automatically recharging the auxiliary reservoir without releasing the brakes and previous to another or heavier application thereof, said valve consisting of a body having a central longitudinal bore, a connection between one end of the bore and the brake cylinder, a connection between the other end of the bore and the train line, connections respectively connecting the bore and the slide valve chamber and the check valve chamber of the triple valve, and a piston valve adapted upon the release of air from the auxiliary reservoir into the brake cylinder to restrict communication from the train line to the check valve chamber of the triple valve.

17. In combination with an air brake system including a train line, a triple valve, an auxiliary reservoir and brake cylinder, of a valve connected therewith for automatically recharging the auxiliary reservoir without releasing the brakes and previous to another or heavier application thereof, said valve consisting of a body having a central longitudinal bore, a piston valve slidably mounted within the bore, a connection between one end of the bore and the brake cylinder, a connection between the other end of the bore and the train line, connections respectively connecting the bore and the slide valve chamber and the check valve chamber of the triple valve, a piston arranged within the body, resilient means arranged between the piston and the piston valve, the said piston being adapted upon reduction of air pressure in the brake cylinder to permit the air pressure in the train line to shift the piston valve and thereby make direct communication between the train line and the check valve chamber of the triple valve and simultaneously cut off communication from the train line to and the slide valve chamber of the triple valve.

18. An automatic valve of the class described, comprising a body having a central longitudinal bore, coupling means carried by one end of the body for connecting the train line with the bore, a cap secured to the opposite end and adapted to be connected to the brake cylinder, a piston slidably mounted within the cap, a piston valve slidably mounted within the bore for a limited movement, and resilient means interposed between the piston and the piston valve.

19. An automatic valve of the class described, comprising a body having a central longitudinal bore, coupling means carried by one end of the body for connecting the train line with the bore, a cap secured to the opposite end and adapted to be connected to the brake cylinder, a piston slidably mounted within the cap, a passage communicating with the bore and adapted to be connected to the slide valve chamber of the triple valve, another passage communicating with the bore and adapted to be connected with the check valve chamber of the triple valve, a piston valve slidably mounted within the bore for a limited movement, and resilient means interposed between the piston and the piston valve, said valve being adapted upon movement of the piston in one direction to uncover the passage communicating with the slide valve chamber of the triple valve.

20. An automatic valve of the class described, comprising a body having a central longitudinal bore, coupling means carried by one end of the body for connecting the train line with the bore, a cap secured to the opposite end and provided with a hollow extension adapted to be connected with the brake cylinder, a piston slidably mounted within the cap and provided with an extension slidably mounted within the said hollow extension of the cap, a passage formed in the body and communicating with the bore and adapted to be connected with the slide valve chamber of the triple valve, another passage formed in the body and communicating with the bore and adapted to be connected with the check valve chamber of the triple valve, a piston valve slidably mounted within the bore for a limited movement, and resilient means interposed between the piston and the piston valve, said valve being adapted upon movement of the piston in one direction to uncover the passage communicating with the slide valve chamber of the triple valve.

21. An automatic valve of the class described, comprising a body having a central longitudinal bore, coupling means carried by one end of the body for connecting the train line with the bore, a cap secured to the opposite end and provided with a hollow extension adapted to be connected with the brake cylinder, a piston slidably mounted within the cap and provided with an extension slidably mounted within the said hollow extension of the cap, said piston extension being provided on its periphery with one or more longitudinal passages communicating with the end of the cap extension and the interior thereof in rear of the piston, a passage formed in the body and communicating with the bore and adapted to be connected with the slide valve chamber of the triple valve, another passage formed in the body and communicating with the bore and adapted to be connected with the check valve chamber of the triple valve, a piston valve slidably mounted within the bore for a limited movement, and resilient means interposed between the piston and the piston valve, said valve being adapted upon movement of the piston in one direction to uncover the passage communicating with slide valve chamber of the triple valve.

22. An automatic valve of the class described, comprising a body having a central longitudinal bore, coupling means carried by one end of the body for connecting the train line with the bore, a cap secured to the opposite end and provided with a hollow extension adapted to be connected with the brake cylinder, a piston slidably mounted within the cap and provided with a tubular extension slidably mounted within the said hollow extension of the cap and provided with a closed end, said tubular extension being provided on its periphery with one or more passages communicating with the end of the hollow extension of the cap and of the interior thereof, a passage formed in the body and communicating with the bore and adapted to be connected with the slide valve chamber of the triple valve, another passage formed in the body and communicating with the bore and adapted to be connected with the check valve chamber of the triple valve, a piston valve slidably mounted within the bore for a limited movement, and a coiled spring interposed between the piston and the piston valve, one end of the spring being seated within the tubular extension of the said piston, said piston valve being adapted upon movement of the piston in one direction to uncover the passage communicating with the slide valve chamber of the triple valve.

23. An automatic valve of the class described, comprising a body having a central longitudinal bore, coupling means carried by one end of the body for connecting the train line with the bore, a cap secured to the opposite end and provided with a hollow extension adapted to be connected with the brake cylinder, a piston slidably mounted within the cap and provided with a tubular extension slidably mounted within the said hollow extension of the cap and provided with a closed end, said tubular extension being provided on its periphery with one or more passages communicating with the end of the hollow extension of the cap and the interior thereof, a passage formed in the body and communicating with the bore and adapted to be connected with the slide valve chamber of the triple valve, another passage formed in the body and communicating with the bore and adapted to be connected with the check valve chamber of the triple valve, a piston valve slidably mounted within the bore for a limited movement, and provided with a counter bore and a centrally arranged projecting stem, a coiled spring interposed between the piston and the piston valve and arranged around the stem of the piston valve, the ends of the spring being respectively seated within the tubular extension of the piston and the counter bore of the piston valve.

24. An automatic valve of the class described, comprising a body having a central longitudinal bore, coupling means carried by one end of the body for connecting the train line with the bore, the other end of the body being enlarged and provided with a counter bore, said enlarged end being further provided with a second counter bore and forming a consequent shoulder contiguous to the bore of the body, a central apertured disk mounted on the end of the said enlarged end of the body and provided with an off set flange adapted to be detachably connected with the wall of the first mentioned counter bore, a cap secured to the said enlarged end of the body and provided with a hollow extension adapted to be connected with the brake cylinder, a piston slidably mounted within the cap and provided with an extension slidably mounted within the said hollow extension of the cap, said extension being provided on its periphery with one or more passages communicating with the end of the hollow extension of the cap and the interior thereof, the said enlarged end of the body and the disk being provided with a registering passage communicating with the interior of the cap and the exterior of the body, a passage formed in the body and communicating with the bore and adapted to be connected with the slide valve chamber of the triple valve, another passage formed in the body and communicating with the bore and adapted to be connected with the check valve chamber of the triple valve, a piston valve slidably mounted within the bore and provided at one end with a peripheral flange adapted to coact with the consequent shoulder of the second mentioned bore of the body and disk for limiting the movement thereof, and resilient means interposed between the piston and the piston valve, said valve being adapted upon movement of the piston in one direction to uncover the passage communicating with the slide valve chamber of the triple valve.

In testimony whereof I have signed my name to this specification in the presence of two subscribing witnesses.

CARL R. DAELLENBACH.

Witnesses:
ELIZABETH H. HUTZEN,
JOHN E. BANNER.

---

Copies of this patent may be obtained for five cents each, by addressing the "Commissioner of Patents, Washington, D. C."